US008679686B2

(12) United States Patent
Patoux et al.

(10) Patent No.: US 8,679,686 B2
(45) Date of Patent: Mar. 25, 2014

(54) NON-AQUEOUS ELECTROLYTE FOR A HIGH-VOLTAGE LITHIUM BATTERY

(75) Inventors: Sébastien Patoux, Fontaine (FR); Carole Bourbon, Saint Michel de Saint-Geoirs (FR); Sébastien Martinet, Grenoble (FR); Carole Pagano, Saint-Ismier (FR); Lucas Sannier, Calais (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 378 days.

(21) Appl. No.: 13/000,782

(22) PCT Filed: Jun. 11, 2009

(86) PCT No.: PCT/FR2009/000697
§ 371 (c)(1),
(2), (4) Date: Mar. 17, 2011

(87) PCT Pub. No.: WO2010/007223
PCT Pub. Date: Jan. 21, 2010

(65) Prior Publication Data
US 2011/0171539 A1    Jul. 14, 2011

(30) Foreign Application Priority Data
Jun. 25, 2008   (FR) .................................. 08 03565

(51) Int. Cl.
*H01M 6/16*   (2006.01)
*H01M 4/13*   (2010.01)

(52) U.S. Cl.
USPC ........................ 429/343; 429/223; 429/224

(58) Field of Classification Search
USPC .......... 429/218.1, 223, 224, 231.95, 340–343
See application file for complete search history.

(56) References Cited

U.S. PATENT DOCUMENTS

| 5,296,319 | A | 3/1994 | Bito et al. | |
|---|---|---|---|---|
| 2004/0170903 | A1 | 9/2004 | Fukuoka et al. | |
| 2006/0115739 | A1* | 6/2006 | Yamaguchi et al. | .......... 429/326 |
| 2007/0196740 | A1 | 8/2007 | Haruna et al. | |
| 2007/0254215 | A1* | 11/2007 | Morikawa et al. | ............. 429/324 |
| 2007/0292760 | A1* | 12/2007 | Patoux et al. | ................. 429/223 |
| 2008/0008928 | A1* | 1/2008 | Partin et al. | ...................... 429/61 |
| 2008/0020276 | A1 | 1/2008 | Horikawa | |
| 2008/0107968 | A1* | 5/2008 | Patoux et al. | ................. 429/223 |

FOREIGN PATENT DOCUMENTS

| EP | 1 320 143 A2 | 6/2003 |
|---|---|---|
| GB | 1 404 355 | 8/1975 |
| JP | 01 030 178 | 2/1989 |
| JP | 2002 100 400 | 4/2002 |
| JP | 2005 243 543 | 9/2005 |
| JP | 2005 322 610 | 11/2005 |
| JP | 2006 066 320 | 3/2006 |
| JP | 2006 252 895 | 9/2006 |
| JP | 2007 172 947 | 7/2007 |
| WO | WO 2007/010915 A1 | 1/2007 |
| WO | WO 2007/142121 A1 | 12/2007 |

OTHER PUBLICATIONS

Search Report and Written Opinion for International Application No. PCT/FR2009/000697, mailed Dec. 7, 2009; 27 pages.
Ufheil, J., et al.; "Maleic anhydride as an additive to γ-butyrolactone solutions for Li-ion batteries"; Electrochimica ACTA; vol. 50, No. 7-8; Feb. 15, 2005; pp. 1733-1738.
Yamane, H., et al.; "A causal study of the capacity fading of $Li_{1.01}MN_{1.99}O_4$ cathode at 80° C., and the suppressing substances of its fading"; Journal of Power Sources; vol. 99; No. 1-2; Aug. 1, 2001; pp. 60-65.

* cited by examiner

*Primary Examiner* — Patrick Ryan
*Assistant Examiner* — Muhammad Siddiquee
(74) *Attorney, Agent, or Firm* — Alston & Bird LLP

(57) ABSTRACT

The invention relates to a positive electrode/electrolyte pair for lithium batteries operating at a voltage above 4.2 V versus Li+/Li. The electrolyte of the lithium battery used in the invention includes at least a first additive chosen from optionally substituted, cyclic or acyclic, carboxylic or dicarboxylic anhydrides and carboxylic or dicarboxylic acids, and mixtures thereof, and optionally a second additive which is a lithium salt, the total content of additive(s) being greater than or equal to 0.01% by weight and less than or equal to 30% by weight, relative to the total weight of electrolyte, and the positive electrode is made of a material having a spinel structure. The lithium batteries of the invention are applicable in particular in the field of portable equipment, such as telephones, computers, camcorders, cameras and tooling.

9 Claims, 3 Drawing Sheets

NON-AQUEOUS ELECTROLYTE FOR A HIGH-VOLTAGE LITHIUM BATTERY

FIELD OF THE INVENTION

The present invention relates to a positive electrode/electrolyte pair and a lithium battery comprising such a pair.

BACKGROUND OF THE INVENTION

Lithium (Li-ion) batteries are being increasingly used as self-contained power sources, in particular in portable equipment (telephones, computers, camcorders, photographic apparatus, tooling, etc.) where they are progressively replacing nickel, cadmium (Ni—Cd) and metal nickel-hydride (Ni-MH) batteries. For several years, sales of Li-ion batteries have exceeded those of Ni-MH and Ni—Cd batteries. This development is explained by continuous improvements to the performance of lithium batteries, in this way giving them mass and volume energy densities that are clearly greater than those provided by Ni—Cd and Ni-MH technologies. While the first Li-ion accumulator batteries possessed an energy density of approximately 80-90 Wh/kg, energy densities close to 200 Wh/kg are from now on obtained (energy density related to the mass of the complete Li-ion cell) As a comparison, Ni-MH batteries possess a maximum energy density of approximately 100 Wh/kg and Ni—Cd batteries have an energy density of the order of 50 Wh/kg.

New generations of lithium batteries are already in the process of development for even more diversified applications (hybrid or all-electric automobiles, energy storage by photovoltaic cells etc.). In order to meet even greater demands for operating and energy potential (per unit mass and/or volume), research has been carried out to develop new materials for Li-ion battery electrodes that are even more efficient and for electrolytes capable of operating over a wide range of potential.

Active electrode compounds used in commercial Li-ion batteries are, for the positive electrode, lamellar compounds such as $LiCoO_2$, $LiNiO_2$ and mixed compounds $Li(Ni, Co, Mn, Al)O_2$ or compounds with a spinel structure such as $LiMn_2O_4$ and its derivatives. The negative electrode is generally carbon (graphite, coke etc) or possibly the spinel oxide $Li_4Ti_5O_{12}$ or a metal forming an alloy with lithium (Sn, Si etc). The theoretical and practical specific capacities of the positive electrode compounds referred to are respectively approximately 275 mAh/g and 140 mAh/g for oxides with a lamellar structure ($LiCoO_2$ and $LiNiO_2$) and 148 mAh/g and 120 mAh/g for the spinel $LiMn_2O_4$. In all cases, an operating voltage close to 4 volts is obtained, relative to metallic lithium.

In addition, it is known that increasing the capacity and/or raising the redox potential of the material of the positive electrode has a greater impact on the increase in total energy density of the battery than an increase of the same order at the negative electrode.

Also, over the last few years, a number of research projects have been undertaken with the aim of providing new positive electrode materials with high-voltage capacity. Recently, positive electrode materials having high-voltage electrochemical activity, beyond 4.2 V versus $Li^+/Li$, have been developed in order to increase the energy density of lithium batteries and possibly to reduce the number of elements to be used in series in applications requiring a high voltage. Among the new promising compounds, the orthophosphates $LiCoPO_4$ and $LiNiPO_4$, spinel oxides of the $LiNi_{0.5}Mn_{1.5}O_4$ and $LiNi_{0.4}Mn_{1.6}O_4$ type and lamellar oxides of the $Li(Mn, Co, Ni) O_2$, $Li_2MnO_3$, $Li(Mn, Co, Ni)O_2$ type and their derivatives may be mentioned as examples of compounds functioning, at least partly, above 4.2 V versus $Li^+/Li$ or even above 4.5 V versus $Li^+/Li$. In the case of the compound $LiCoPO_4$ for example, the electrochemical activity, corresponding to the oxidation of $Co^{2+}$ ions, takes place at approximately 4.8 V versus $Li^+/Li$.

Conventional electrolytes used in Li-ion batteries are mainly compounds of a lithium salt, for example chosen from $LiClO_4$, $LiAsF_6$, $LiPF_6$, $LiBF_4$, $LiR_FSO_3$, $LiCH_3SO_3$, $LiN(R_FSO_2)_2$, $LiC(R_FSO_2)_2$, ($R_F$ being chosen from a fluorine atom and a perfluoroalkyl group having between one and eight carbon atoms), lithium trifluoromethanesulfonylimide (LiTFSI), lithium bis(oxalato)borate (LIBOB), lithium bis (perfluoroethylsulfonyl)imide (LiBETI), lithium fluoroalkylphosphate (LiFAP), dissolved in a mixture of organic solvents based on cyclic and acyclic carbonates (for example a mixture of methylene carbonate and dimethyl carbonate). Such an electrolyte possesses good ionic conductivity, often greater than $10^{-3}$ S/cm, and makes it possible to obtain suitable electrochemical performance (life, autodischarge etc) within a potential window generally between 0 and 4.2 V versus $Li^+/Li$. Apart from liquid electrolytes, dry polymeric electrolytes and gelled electrolytes also exist. The first of these are based on polyethylene oxide or one of its derivatives and have to be operated at approximately 80° C. (that is above the usual temperatures at which telephones, computers and other applications are used) so as to have sufficient ionic conductivity available. The second of these consists of polymers such as PVDF, PEO, PAN and PVC that have soaked up a liquid electrolyte such as those previously described, and are thus subject, in the best cases, to the same potential limitations.

However, under operating conditions above 4.2 V versus $Li^+/Li$ these electrolytes are not stable (partial or total oxidation of the electrolyte) and bring about rapid autodischarge of the battery when the latter is partially or totally discharged, this phenomenon being particularly accentuated above 4.5 V versus $Li^+/Li$. The absence of electrolyte capable of operating at a high voltage is thus a brake on the development of high-voltage lithium batteries, and thus of large energy densities.

A few years ago, it was reported that certain liquid solvents of the sulfone type, for example, were stable at a high voltage (XU et al. Electrochemical and Solid-State Letters, 5(1): A26-A29, 2002). Nevertheless, these solvents have not found a practical application in lithium batteries, certainly on account of their reactivity (degradation) at a low potential (below 1 V versus $Li^+/Li$), and their high viscosity at ambient temperature. Moreover, their high voltage stability remains to be demonstrated under actual conditions of use.

Similarly, a class of electrolytes exists, ionic liquids, which were initially considered as stable over a wide voltage range, in particular at a high voltage. Ionic liquids are molten salts composed of large-size organic cations and organic or inorganic anions with a more modest size. A lithium salt, for example $LiBF_4$, $LiBF_6$ or LiTFSI, has to be added to these liquids for use in Li-ion batteries. From a practical point of view, current ionic liquids remain too viscous at ambient temperature and it is generally necessary to add organic solvents in order to reduce the viscosity of the medium.

Dry polymeric electrolytes and gelled electrolytes also exist. The first of these are based on polyethylene oxide or one of its derivatives and have to be operated at approximately 80° C. (above the normal temperatures at which telephones, computers and other applications are used) so as to have available sufficient ionic conductivity. The second ones consist of polymers such a PVDF, PEO, PAN and PVC that have soaked up a liquid electrolyte such as those previously described, and are thus subject, in the best cases, to the same potential limitations.

More particularly, Zhang, Journal of Power Sources, 162: 1379-1394, 2006, reviews various electrolyte additives having one or more functions for improving the performance of lithium batteries. Among these, one category is briefly presented that enables the positive electrode to be protected (cf. p 1385-1386, paragraph 3 "Cathode protection agent"). With this aim in mind, amine compounds (butylamine), imide compounds (N,N'-dicyclohexylcarbodiimide) and amino-silane compounds (N,N'-diethylaminotrimethylsilane) are on the one hand indicated that are capable of reducing either impurities in the water and acids present in the electrolyte and/or electrode, or the too high dissolution of metal ions coming mainly from the positive electrode or current collector, and on the other hand lithium salts are indicated such as LiBOB as electrode additives capable of forming a protective film at the surface of the cathode. However, this document is silent as regards the stability of these additives and their capacity to reduce the problem of autodischarge at high voltages, above 4.2 V versus $Li^+/Li$.

It has therefore been proved that research carried out these last few years will from now on make it possible to obtain a high potential difference between the two electrodes (a negative electrode material operating at a low voltage and a positive electrode material operating at a high voltage). However, to date, no lithium battery electrolyte exists that is truly stable and capable of operating above approximately 4.2 V versus $Li^+/Li$, and in particular between 4.2 and 4.5 V versus $Li^+/Li$ under the usual operating conditions. More precisely, the positive electrode/electrolyte interface is unstable at a high voltage and on account of this brings about a rapid discharge when the battery is stored at a high voltage. Autodischarge is an extremely important parameter since it corresponds to the energy loss of a battery after a more or less long storage period and therefore less energy that is still available.

SUMMARY OF THE INVENTION

On account of this, the object of the invention is to provide a positive electrode/electrolyte pair for a lithium battery that may be used for operation over a range of potential beyond 4.2 V versus $Li^+/Li$ at least, so as to reduce the autodischarge of this high-voltage battery.

To this end, the invention provides a positive electrode/electrolyte pair characterized in that the positive electrode is made of a material with a spinel structure of the following formula (I) and a cell parameter of between 8.167 and 8.190 Å:

$Li_yNi_{0.5-x}Mn_{1.5+x}O_{4-\delta}$ 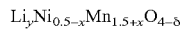 Formula (I)

in which:
0.9<y≤1.1;
0≤x≤0.1; and
δ≥0,
and in that the electrolyte is a solution of a lithium salt containing at least one first additive chosen from cyclic or acyclic carboxylic or dicarboxylic anhydrides, carboxylic or dicarboxylic acids, possibly substituted, and mixtures thereof, and optionally a second additive that is a lithium salt.

In this pair, the total amount of additive(s) of the electrolyte is preferably greater than or equal to 0.01% by weight and less than or equal to 30% by weight relative to the total weight of electrolyte.

More preferably, the total amount of additive(s) of the electrolyte is preferably greater than or equal to 1% by weight and less than or equal to 15% by weight relative to the total weight of electrolyte.

More preferably, the total amount of additive(s) of the electrolyte is preferably 10% by weight relative to the total weight of electrolyte.

In all cases, said at least one first electrolyte additive is preferably chosen from carboxylic or dicarboxylic anhydrides, carboxylic or dicarboxylic acids, substituted by a halogen atom, an alcohol group or an aromatic hydride group.

However, more preferably, said at least one first electrolyte additive is chosen from a carboxylic or dicarboxylic anhydride substituted by a chlorine atom or a bromine atom.

Even more preferably, said at least one first electrolyte additive is chosen from ethanoic anhydride, propanoic anhydride, benzoic anhydride, butanoic anhydride, cis-butenedioic anhydride, butane-1,4-dicarboxylic anhydride, pentane-1,5-dicarboxylic anhydride, hexane-1,6-dicarboxylic anhydride, 2,2-dimethylbutane-1,4-dicarboxylic anhydride, 2,2-dimethylpentane-1,5-dicarboxylic anhydride, 4-bromophthalic anhydride, 4-chloroformylphthalic anhydride, phthalic anhydride, benzoglutaric anhydride, 2-methylenebutane-1,4-dicarboxylic anhydride and their carboxylic acid derivatives.

More preferably, said at least one first electrolyte additive is pentane-1,5-dicarboxylic anhydride and 2-methylenebutane-1,4-dicarboxylic anhydride.

The second electrolyte additive, when present, is preferably lithium bis(oxalato)borate (LiBOB) of formula $LiBC_4O_8$.

In addition, preferably, in the pair of the invention, the positive electrode is made of a material with a spinel structure of formula (I) that has a cell parameter of between 8.179 and 8.183 Å.

More preferably, in the pair of the invention, the positive electrode is made of a material with a spinel structure of formula $LiNi_{0.4}Mn_{4.6}O_4$.

The invention also provides a lithium battery that has a positive electrode/electrolyte pair according to the invention.

BRIEF DESCRIPTION OF THE DRAWINGS

The invention will be better understood and other advantages and features thereof will become more clearly apparent on reading the following explanatory description that is made with reference to the appended figures in which.

Figure 1:
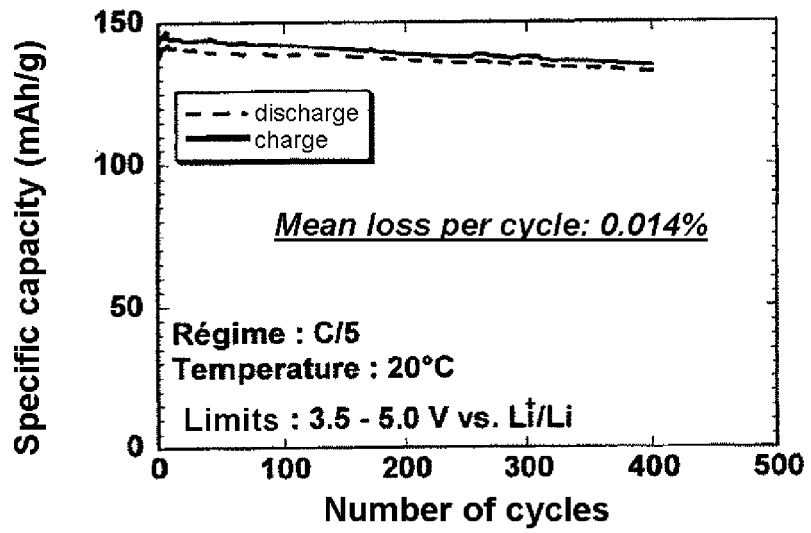
FIG. 1 is a graph representing capacity as a function of the number of cycles of a lithium battery having an electrolyte of the prior art based on $LiPF_6$ (1 mol/L) and a positive electrode made of a spinel material according to the invention of formula $LiNi_{0.4}Mn_{1.6}O_4$ in intentiostatic mode (C/5 régime, namely charge (or discharge) of the battery in 5 hours; 20° C.).

Many investigations of the prior art relating to electrolyte additives, aimed at improving the conductivity of the electrolyte or at reducing its flammable character or furthermore at creating protection against overcharge. In particular, in the case where the electrolyte creates protection against overcharge, additives added to the electrolyte act as a "fuse" so that the battery considered does not reach too high a voltage.

DETAILED DESCRIPTION OF THE INVENTION

In contrast, the invention provides protection for the positive electrode/electrolyte interface at a high voltage by adding specific additives dissolved in the electrolyte. For this, the additive or mixture of additives should either decompose when the battery is first charged and form a protective stable deposit at the positive electrode/electrolyte interface (in situ passivation of the electrode), said battery being then stabilized for future charge/discharge cycles and for periods in open circuit (storage) or should directly bring about a modification of the stability limit in potential of the electrolyte without necessarily forming a protective deposit. Such an additive is to be used in combination with developing positive electrode materials at a high voltage, and not with conventional materials of which the upper limit is under 4.2-4.5 V versus $Li^+/Li$. In particular the compounds $LiNi_{0.5}Mn_{1.5}O_4$, $LiNi_{0.4}Mn_{1.6}O_4$, $LiCoPO_4$, $LiNiPO_4$ are concerned as well as lamellar oxides of the $Li(Li, Mn, Co, Ni)O_2$ type. The negative electrode may consist of any materials known to this end (lithium, carbon, titanium oxides, silicon etc). In particular, within the context of the use of the positive electrode/electrolyte pair in high-voltage mode, it is desirable for the electrolyte to decompose before the applied voltage affects the integrity of the positive electrode.

In this way, the electrolyte used may contain either a single additive chosen from cyclic or acyclic carboxylic and dicarboxylic anhydrides or carboxylic or dicarboxylic acids, possibly substituted, or said additive(s) used jointly with another additive such as another cyclic or acyclic carboxylic and dicarboxylic anhydride or carboxylic or dicarboxylic acid, possibly substituted, or any other additive such as a lithium salt, for example lithium bis(oxalato)borate (LiBOB). In point of fact, it has become apparent, through experimentation, that coupling a carboxylic anhydride and LiBOB, also as an additive and not as the main lithium salt, enables more reduced autodischarge values to be obtained.

Such electrolytes containing such additives are already known but it is the use of them in a battery operating at a potential above 4.2 V versus $Li^+/Li$ that had never been envisaged by reason of the lack of stability of such a system.

Now, it has been discovered that this stability problem is solved in the invention by using these additives in combination with a positive electrode made of a spinel material of the following formula (I), which has a cell parameter of between 8.167 and 8.190 Å:

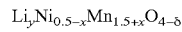  Formula (I)

in which:
  $0.9 < y \leq 1.1$;
  $0 \leq x \leq 0.1$; and
  $\delta \geq 0$.

The subject of the present invention is therefore a positive electrode/electrolyte pair for a lithium battery, the electrolyte containing at least one additive chosen from cyclic or acyclic carboxylic or dicarboxylic anhydrides, carboxylic or dicarboxylic acids, possibly substituted, and mixtures thereof, and optionally a second additive that is a lithium salt, and the total amount of electrolyte additive(s) being greater than or equal to 0.01% by weight and less than or equal to 30% by weight relative to the total weight of electrolyte, and the positive electrode being made of a material with a spinel structure having the following formula (I):

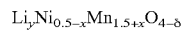  Formula (I)

in which:
  $0.9 < y \leq 1.1$;
  $0 \leq x \leq 0.1$; and
  $\delta \geq 0$, having a cell parameter of between 8.167 and 8.190 Å.

Preferably, the material with a spinel structure of the positive electrode of the pair of the invention has the formula (I) above in which $0.5 \geq \delta \geq 0$.

According to a preferred embodiment of the present invention, the amount of electrolyte additive(s) is greater than 1% by weight and less than or equal to 15% by weight relative to the total weight of electrolyte, preferably greater than 5% by weight and less than or equal to 10% by weight relative to the total weight of electrolyte and more preferably it is 10% by weight, relative to the total weight of electrolyte.

According to the invention, said at least first electrolyte is chosen from carboxylic or dicarboxylic anhyrides and carboxylic or dicarboxylic acids, substituted by a halogen, an alcohol group or an aromatic ring, substituted or not.

According to a preferred embodiment of the present invention, said at least one first electrolyte additive is a carboxylic or dicarboxylic anhydride substituted by a fluorine atom, a chlorine atom or a bromine atom.

Preferably, said at least one first electrolyte additive is chosen from ethanoic anhydride, propanoic anhydride, benzoic anhydride, butanoic anhydride, cis-butenedioic anhydride, butane-1,4-dicarboxylic anhydride, pentane-1,5-dicarboxylic anhydride, hexane-1,6-dicarboxylic anhydride, 2,2-dimethylbutane-1,4-dicarboxylic anhydride, 2,2-dimethylpentane-1,5-dicarboxylic anhydride, 4-bromophthalic anhydride, 4-chloroformylphthalic anhydride, phthalic anhydride, benzoglutaric anhydride, 2-methylenebutane-1,4-dicarboxylic anhydride and their carboxylic acid derivatives.

More preferably, said at least one first electrolyte additive is pentane-1,5-dicarboxylic anhydride or 2-methylenebutane-1,4-dicarboxylic anhydride.

2-methylene-1,4-dicarboxylic anhydride is also called itaconic anhydride.

According to a preferred embodiment of the present invention, said electrolyte used in the invention additionally contains a second additive that is lithium bis(oxalato)borate (Li-BOB) of formula $LiBC_4O_8$.

In another preferred embodiment of the present invention, the positive electrode used in the invention is made of a spinel material of formula (I) that has a cell parameter of between 8.179 and 8.183 Å.

A particularly preferred positive electrode material in the invention has the formula $LiNi_{0.4}Mn_{1.6}O_4$.

The spinel materials of formula (I) as well as methods for their preparation are described in French patent n° 2 890 241 A1.

In order to understand the invention better, non-limiting examples of implementing methods will be described hereinafter demonstrating the effect of various amounts of butane-1,4-dicarboxylic anhydride, pentane-1,5-dicarboxylic anhydride and 2-methylene-1,4-dicarboxylic anhydride within an electrolyte of a lithium battery, when used in combination with a positive electrode made of a spinel material of formula (I).

In order to test the effectiveness of the positive electrode/electrolyte pairs of the invention in limiting the problem of autodischarge, lithium batteries with a "button cell" format were assembled with:

a negative lithium electrode (16 mm in diameter, 135 μm thick) deposited on a nickel disk acting as a current collector, a positive electrode consisting of a 14 mm diameter disk taken from a 25 μm thick composite film comprising the material $LiNi_{0.4}Mn_{1.6}O_4$ (80% by weight) prepared as indicated below, carbon black (10% by weight) as a conductive material and polyvinylidene hexafluoride (10% by weight) as a binder, all being deposited on a current collector made of aluminum (20 μm thick sheet), a separator that has soaked up a liquid electrolyte based on the $LiPF_6$ salt (1 mol/L) dissolved in a mixture of ethylene carbonate, propylene carbonate and dimethyl carbonate (1/1/3 ratio by weight).

In order to prepare the compound $LiNi_{0.4}Mn_{1.6}O_4$, an intimate mixture of precursors based on carbonates (8.168 g of nickel carbonate, 6.261 g of lithium carbonate and 30.641 g of manganese carbonate) was prepared by milling in a planetary mill of the Retsch type in a 250 ml bowl containing 13 balls 20 mm in diameter and 10.8 g each, for 20 hours (4×5 hours) at 500 rpm in the presence of hexane (powder submerged). The mixture was dried overnight at 55° C., then treated at 600° C. (10 hours) then at 900° C. (15 hours) and was then cooled to ambient temperature at a rate of 1° C./min. The powder was then placed in aqueous solution (1 L) for 24 hours with magnetic stirring. It was then washed with distilled water. Finally, heat treatment was performed at 350° C. for 3 hours and cooling was carried out at a rate of 1° C./min.

In the electrolyte, amounts of 0% to 18% by weight of butane-1,4-dicarboxylic anhydride or 2% by weight of pentane-1,5-dicarboxylic anhydride or 2-methylenebutane-1,4-dicarboxylic anhydride were added (the salt no longer dissolves beyond 18% by weight).

The electrochemical characteristics of these $LiNi_{0.4}Mn_{1.6}O_4$/Li batteries were studied at a high potential (mainly above 4.2 V versus $Li^+$/Li).

The results are reported in FIGS. 4 to 6 and in table 1 below, in which the specific capacities gathered from the figures and curves in continuous cycling (charge/discharge at C/5; 20° C.) are reported for various amounts of butane-1,4-dicarboxylic anhydride and an amount of 2% for 2-methylenebutane-1,4-dicarboxylic anhydride within the electrolyte.

As a comparative example, under the same conditions, a lithium battery with a button cell format was tested, comprising:

the same negative lithium electrode as previously, a positive electrode consisting of a 14 mm diameter disk taken from a 25 μm composite film comprising the material $LiCoPO_4$ (80% by weight) prepared as in the previous example, carbon black (10% by weight) as a conductive material and polyvinylidene hexafluoride (10% by weight) as a binder, all being deposited on a current collector made of aluminum (20 μm thick sheet).

Still as a comparative example, lithium batteries were also tested like those previously described, that is to say having a positive electrode made of $LiNi_{0.4}Mn_{1.6}O_4$ material, but with an electrolyte according to the prior art based on $LiPF_6$ (1 mol/L).

The results are given in FIGS. 1 to 3 and in table 1 below.

TABLE 1

| Positive electrode material | Additive material | % additive by weight | Capacity in discharge (continuous cycling) (mAg/h) | Restituted capacity in discharge after 14 days in open circuit (autodischarge) (mAg/h) | % autodischarge |
|---|---|---|---|---|---|
| $LiCoPO_4$ | | 0% | 146 | 52 | 64% |
| $LiCoPO_4$ | Pentane-1,5-dicarboxylic anhydride | 2% | 139 | 82 | 41% |
| $LiNi_{0.4}Mn_{1.6}O_4$ | | 0% | 137 | 62 | 54.8% |
| $LiNi_{0.4}Mn_{1.6}O_4$ | Butane-1,4-dicarboxylic anhydride | 1% | 137 | 103 | 24.8% |
| $LiNi_{0.4}Mn_{1.6}O_4$ | Butane-1,4-dicarboxylic anhydride | 2% | 139 | 107 | 23% |
| $LiNi_{0.4}Mn_{1.6}O_4$ | Butane-1,4-dicarboxylic anhydride | 5% | 137 | 106 | 22.6% |
| $LiNi_{0.4}Mn_{1.6}O_4$ | | 10% | 138 | 111 | 19.6% |
| $LiNi_{0.4}Mn_{1.6}O_4$ | 2-methylene butane-1,4-dicarboxylic anhydride | 2% | 138 | 124 | 10.1% |

It may be seen from FIG. 1 that the use of a positive electrode made of a spinel material of formula $LiNi_{0.4}Mn_{1.6}O_4$, that is to say an electrode according to the pair of the invention, but with a conventional electrolyte, $LiPF_6$, without an additive, makes it possible to obtain a battery of which the capacity is relatively stable in continuous cycling.

However, as may be seen from table 1, such a battery has an autodischarge percentage of 54.8%.

Figure 2:
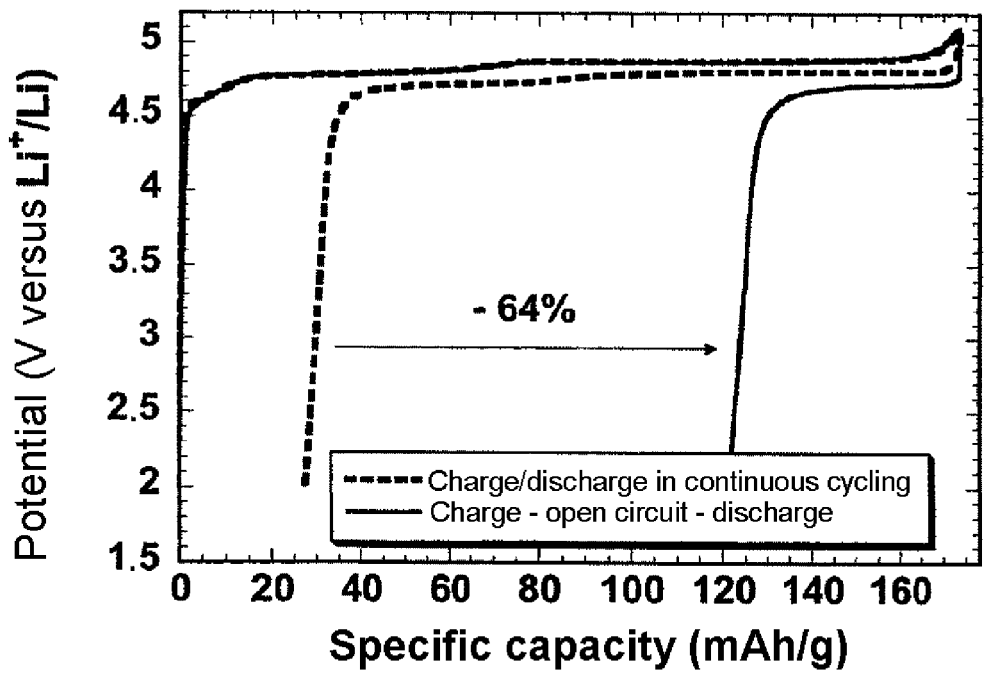
FIG. 2 is a graph representing the curve in charge/discharge (C/5 régime; 20° C.), with or without a period of 14 days in open circuit after charging, the batteries having an electrode according to the prior art made of $LiCoPO_4/Li$ and an electrolyte according to the prior art based on $LiPF_6$ (1 mol/L)
Figure 3:
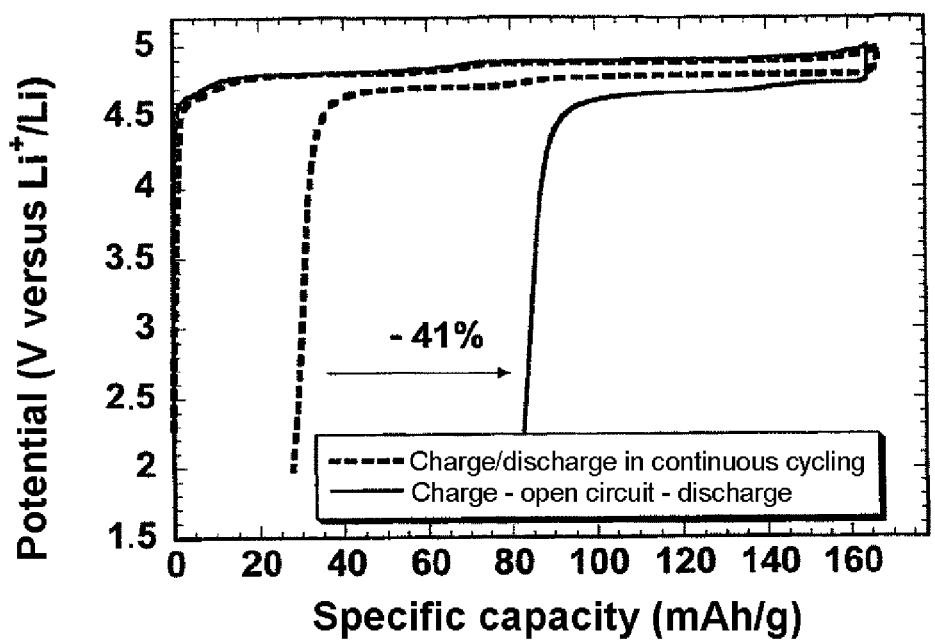
FIG. 3 is a graph representing the charge curve in intentiostatic mode (C/5 régime; 20° C.), with or without a period of 14 days in open circuit of a lithium battery having an electrolyte according to the invention based on $LiPF_6$ (1 mol/L) and containing 2% by weight relative to the total weight of pentane-1,5-dicarboxylic anhydride electrolyte and an electrode according to the prior art made of $LiCoPO_4$.

In addition, it may be seen from FIGS. 2 and 3 that by using a positive electrode made of a conventional material, $LiCoPO_4$, the addition of an electrolyte according to the invention only improves the autodischarge percentage by 23%.

Figure 4:
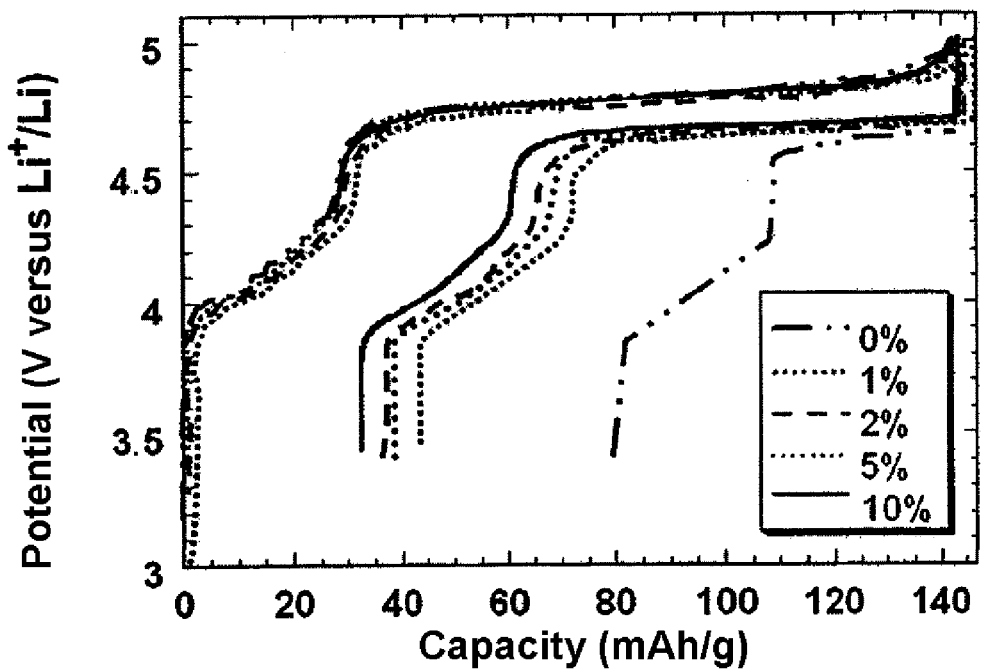
FIG. 4 is a graph representing the charge curve in intentiostatic mode (C/5 régime; 20° C.), followed by a rest of 14 days in open circuit and then a discharge in intentiostatic mode (C/5 régime; 20° C.) of lithium batteries, each having an electrode according to the invention made of a spinel material $LiNi_{0.4}Mn_{1.6}O_4$ and an electrolyte according to the invention based on $LiPF_6$ (1 mol/L) containing variable amounts of butane-1,4-dicarboxylic anhydride.
Figure 5:
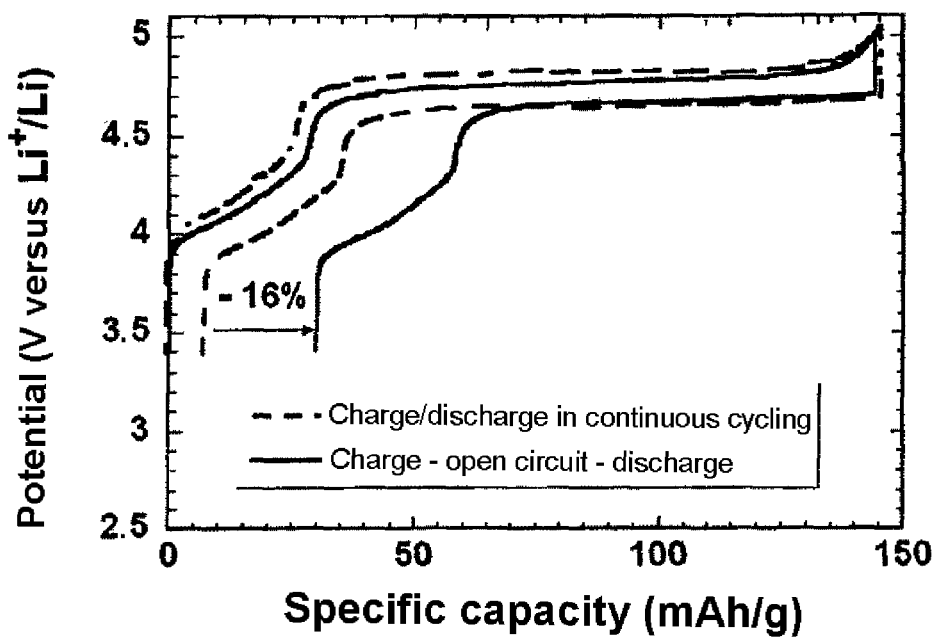
FIG. 5 is a graph representing charge/discharge curves (C/5 régime; 20° C.), with or without a period of 14 days in open circuit after charge, a lithium battery having an electrode according to the invention made of a spinel material $LiNi_{0.4}Mn_{1.6}O_4$ and an electrolyte according to the invention based on $LiPF_6$ (1 mol/L) containing 2% by weight relative to the total weight of electrolyte, pentane-1,5-dicarboxylic anhydride.
Figure 6:
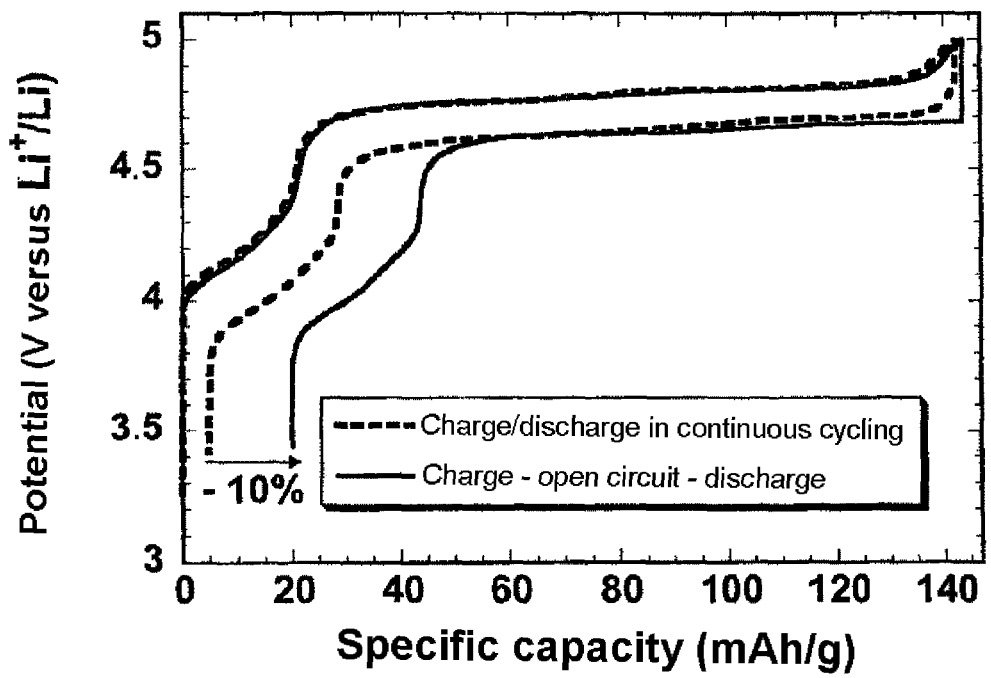
FIG. 6 is a graph representing charge/discharge curves (C/5 régime; 20° C.), with or without a period of 14 days in open circuit after charge, of a lithium battery having an electrode according to the invention made of a spinel material $LiNi_{0.4}Mn_{1.6}O_4$ and an electrolyte according to the invention based on $LiPF_6$ (1 mol/L) containing 2% by weight relative to the total weight of electrolyte 2-methylene-butane-1,4-dicarboxylic anhydride.

It may be seen from FIGS. 4 to 6 that when the positive electrode/electrolyte pair according to the invention is used, the autodischarge percentage is reduced by 5 to 10 times compared with another positive electrode/electrolyte pair.

Moreover, FIG. 4 and table 1 show the excellent behavior in cycling (small loss of capacity per cycle) and in autodischarge (high restituted capacity in open circuit, low autodischarge), of $LiNi_{0.4}Mn_{1.6}O_4$/Li batteries having an electrolyte based on $LiPF_6$ with the addition of various amounts (1%, 2%, 5%, 10%) of butane-1,4-dicarboxylic anhydride. The reduction in autodischarge of these batteries corresponds to less energy loss after a period of storage at a high-voltage and therefore to greater potential still available.

It may be seen from table 1 that the greater the amount of additive, between 0.01% and 10%, the better are the results in terms of autodischarge while maintaining good capacity of the battery in discharge. The best results are those obtained with an amount of 10% by weight of butane-1,4-dicarboxylic anhydride in the electrolyte.

Just like the additive mentioned previously, an addition of 2% pentane-1,5-dicarboxylic anhydride also makes it possible to reduce autodischarge considerably, with an even better result. In point of fact, as may be seen in FIG. 5, the capacity obtained in discharge with continuous cycling of $LiNi_{0.4}Mn_{1.6}O_4$/Li is 137 mAh/g. The restituted capacity in discharge after 14 days in open circuit (autodischarge) is 114 mAh/g. Thus, in the case of a $LiNi_{0.4}Mn_{1.6}O_4$/Li battery, the autodischarge percentage is only 16% after 14 days.

It will also be seen from FIG. 6 that the best results are obtained when the additive is 2-methylenebutane-1,4-dicarboxylic anhydride.

Although in the preceding examples, the additives used within the electrolyte are butane-1,4-dicarboxylic anhydride, pentane-1,5-dicarboxylic anhydride and 2-methylenebutane-1,4-dicarboxylic anhydride, the reduction in the autodischarge percentage is not limited to lithium batteries having an electrolyte produced from one of these additives, although obviously in combination with a positive electrode made of a material as defined previously. Electrolytes prepared from other additives described in the invention, in combination with a positive electrode made of a spinel material (with a spinel structure) of formula (I), have made it possible to produce various lithium batteries operating at a potential above 4.2 V vs $Li^+$/Li having the above electrochemical properties. Moreover, although in the preceding examples the electrolyte of the lithium battery used is mainly $LiPF_6$, other lithium salts may be used such as $LiClO_4$, $LiAsF_6$, $LiBF_4$, $LiR_FSO_3$, $LiCH_3SO_3$, $LiN(R_FSO_2)_2$, $LiC(R_FSO_2)_3$ ($R_F$ being chosen from a fluorine atom and a perfluoroalkyl group having between one and eight carbon atoms) lithium trifluoromethanesulfonylimide (LiTFSI), lithium bis(oxalato)borate (LiBOB), lithium bis(perfluoroethylsulfonyl)imide (LiBETI) and lithium fluoroalkylphosphate (LiFAP). The lithium salt is preferably dissolved in an aprotic polar solvent and may be supported by a separating element positioned between the two electrodes, the separating element being then soaked in electrolyte. In the case of a lithium battery with a polymeric electrolyte, the lithium salt is not dissolved in an organic solvent but in a solid polymeric composite such as POE (polyethylene oxide), PAN (polyacrylonitrile), PMMA (polymethylmethacrylate), PVdF (polyvinylidene fluoride) and PVC (polyvinyl chloride) or one of their derivatives.

The invention claimed is:

1. A positive electrode/electrolyte pair for a lithium battery, characterized in that:

the positive electrode is made of a material with a spinel structure of the following formula (I) and has a lattice parameter of between 8.167 and 8.190 Å:

$$Li_yNi_{0.5-x}Mn_{1.5+x}O_{4-\delta} \quad \text{Formula (I)}$$

in which:
$0.9 < y \leq 1.1$;
$0 \leq x \leq 0.1$; and
$\delta \geq 0$, and in that:

the electrolyte is a solution of a lithium salt containing at least one first additive chosen from butane-1,4-dicarboxylic anhydride and 2-methylene butane1,4dicarboxylic anhydride, and mixtures thereof, and optionally a second additive that is a lithium salt.

2. The pair as claimed in claim 1, characterized in that the total amount of electrolyte additive(s) is greater than or equal to 0.01% by weight and less than or equal to 30% by weight relative to the total weight of electrolyte.

3. The pair as claimed in claim 1, characterized in that the total amount of additive(s) of the electrolyte is greater than 1% by weight and less than or equal to 15% by weight relative to the total weight of electrolyte.

4. The pair as claimed in claim 1, characterized in that the total amount of additive(s) of the electrolyte is greater than 5% by weight and less than or equal to 10% by weight relative to the total weight of electrolyte.

5. The pair as claimed in claim 1, characterized in that the total amount of additive(s) of the electrolyte is 10% by weight relative to the total weight of electrolyte.

6. The pair as claimed in claim 1, characterized in that the second electrolyte additive, when present, is preferably lithium bis(oxalato)borate (LiBOB) of formula $LiBC_4O_8$.

7. The pair as claimed in claim 1, characterized in that the positive electrode is made of a material with a spinel structure of formula (I) as defined in claim 1 and has a lattice parameter of between 8.179 and 8.183 Å.

8. The pair as claimed in claim 1, characterized in that the positive electrode is made of a material with a spinel structure of formula $LiNi_{0.4}Mn_{1.6}O_4$.

9. A lithium battery characterized in that it comprises a positive electrode/electrolyte pair as claimed in claim 1.

* * * * *